United States Patent
Liang et al.

(10) Patent No.: US 10,956,696 B2
(45) Date of Patent: Mar. 23, 2021

(54) TWO-DIMENSIONAL CODE IDENTIFICATION AND POSITIONING

(71) Applicant: Advanced New Technologies Co., Ltd., George Town (KY)

(72) Inventors: Mingjie Liang, Hangzhou (CN); Jiada Chen, Hangzhou (CN); Shuang Chen, Hangzhou (CN); Pulin Wang, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 16/809,256

(22) Filed: Mar. 4, 2020

(65) Prior Publication Data
US 2020/0380227 A1 Dec. 3, 2020

Related U.S. Application Data

(63) Continuation of application No. PCT/CN2020/071156, filed on Jan. 9, 2020.

(30) Foreign Application Priority Data

May 31, 2019 (CN) .......................... 201910470176.6

(51) Int. Cl.
*G06K 7/10* (2006.01)
*G06K 9/18* (2006.01)
(Continued)

(52) U.S. Cl.
CPC ............. *G06K 7/1417* (2013.01); *G06N 3/08* (2013.01); *G06N 20/00* (2019.01); *G06T 3/4007* (2013.01)

(58) Field of Classification Search
USPC .................... 235/462.01, 462.08–462.1, 494
See application file for complete search history.

(56) References Cited

U.S. PATENT DOCUMENTS 4,998,126 A * 3/1991 Kazami .................... G02B 7/36
  396/125
6,570,616 B1 * 5/2003 Chen ...................... H04N 9/045
  348/272
(Continued)

FOREIGN PATENT DOCUMENTS

CN   102244737   11/2011
CN   106056027   10/2016
(Continued)

OTHER PUBLICATIONS

Zhaoming (CN109815765), English Machine Translation, Jun. 2020, pp. 1-14.*

(Continued)

*Primary Examiner* — Tuyen K Vo
(74) *Attorney, Agent, or Firm* — Fish & Richardson P.C.

(57) ABSTRACT

The present specification provides a two-dimensional code identification method and device, and a two-dimensional code positioning and identification model establishment method and device. The two-dimensional code identification method includes: obtaining a to-be-identified two-dimensional code, and performing global feature positioning detection on the to-be-identified two-dimensional code by using a pre-established two-dimensional code positioning and identification model; performing focus adjustment, based on a predetermined image resolution, on the to-be-identified two-dimensional code on which positioning detection is performed; and decoding the to-be-identified two-dimensional code on which focus adjustment is performed. The present specification can improve the identification accuracy of two-dimensional codes shot in complex scenarios.

27 Claims, 3 Drawing Sheets

(51) Int. Cl.
*G06K 7/14* (2006.01)
*G06N 3/08* (2006.01)
*G06N 20/00* (2019.01)
*G06T 3/40* (2006.01)

(56) References Cited

U.S. PATENT DOCUMENTS

| | | | | |
|---|---|---|---|---|
| 6,781,694 | B2* | 8/2004 | Nahum | G01D 5/34707 |
| | | | | 235/494 |
| 6,941,026 | B1* | 9/2005 | Nadabar | G06K 7/14 |
| | | | | 382/205 |
| 6,983,886 | B2* | 1/2006 | Natsukari | G06K 1/121 |
| | | | | 235/462.09 |
| 8,550,351 | B2* | 10/2013 | Sun | G06K 7/14 |
| | | | | 235/462.1 |
| 2004/0118926 | A1* | 6/2004 | Yavid | G06K 7/0008 |
| | | | | 235/462.23 |
| 2004/0118927 | A1* | 6/2004 | Breytman | G06K 7/10722 |
| | | | | 235/462.37 |
| 2007/0070199 | A1* | 3/2007 | Kung | G08B 13/19602 |
| | | | | 348/155 |
| 2011/0084142 | A1* | 4/2011 | Cheng | G06K 7/10851 |
| | | | | 235/462.25 |
| 2011/0102663 | A1* | 5/2011 | Ichimiya | G03B 13/36 |
| | | | | 348/345 |
| 2012/0085821 | A1* | 4/2012 | Cheng | G06K 7/1413 |
| | | | | 235/436 |
| 2014/0282196 | A1* | 9/2014 | Zhao | G06F 3/013 |
| | | | | 715/771 |
| 2016/0140374 | A1* | 5/2016 | Ye | G06K 7/1417 |
| | | | | 235/437 |
| 2016/0162767 | A1* | 6/2016 | Ito | G06K 19/06037 |
| | | | | 235/494 |
| 2016/0272459 | A1* | 9/2016 | Schatt | G06K 19/06037 |

FOREIGN PATENT DOCUMENTS

| | | |
|---|---|---|
| CN | 107220577 | 9/2017 |
| CN | 107358135 | 11/2017 |
| CN | 108596003 | 9/2018 |
| CN | 109564651 | 4/2019 |
| CN | 109815765 | 5/2019 |
| CN | 110378165 | 10/2019 |
| EP | 1870835 | 12/2007 |

OTHER PUBLICATIONS

CN109564651, English Machine Translation, Jun. 2020, p. 43.*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in international Application No. PCT/CN2020/071156, dated Apr. 9, 2020, 20 pages (with machine translation).

* cited by examiner

TWO-DIMENSIONAL CODE IDENTIFICATION AND POSITIONING

CROSS-REFERENCE TO RELATED APPLICATIONS

This application is a continuation of PCT Application No. PCT/CN2020/071156, filed on Jan. 9, 2020, which claims priority to Chinese Patent Application No. 201910470176.6, filed on May 31, 2019, and each application is hereby incorporated by reference in its entirety.

TECHNICAL FIELD

The present disclosure relates to the field of information technologies, and in particular, to two-dimensional code identification methods and devices, and two-dimensional code positioning and identification model establishment methods and devices.

BACKGROUND

Two-dimensional codes such as quick response (QR) codes are widely used in different scenarios in various industries, which almost involve all aspects of life, for example, mobile payment and information identification based on two-dimensional codes greatly improves convenience of daily life.

SUMMARY

An objective of the present specification is to provide two-dimensional code identification methods and devices, and two-dimensional code positioning and identification model establishment methods and devices, to alleviate the problem of low decoding accuracy in complex scenarios.

According to a first aspect of the present specification, a two-dimensional code identification method is provided, including: obtaining a to-be-identified two-dimensional code, and performing global feature positioning detection on the to-be-identified two-dimensional code by using a pre-established two-dimensional code positioning and identification model; performing focus adjustment, based on a predetermined image resolution, on the to-be-identified two-dimensional code on which positioning detection is performed; and decoding the to-be-identified two-dimensional code on which focus adjustment is performed.

Further, the method of the present specification further includes: collecting a corresponding sample two-dimensional code based on a predetermined environment condition; labeling corresponding identifier information for a specified area of the sample two-dimensional code; and performing training by using the two-dimensional code and identifier information as input data of deep learning to obtain the two-dimensional code positioning and identification model.

Further, the method of the present specification further includes: determining whether a resolution of the to-be-identified two-dimensional code satisfies the predetermined image resolution; and if not, performing focus adjustment, based on the predetermined image resolution, on the to-be-identified two-dimensional code on which positioning detection is performed.

Further, performing focus adjustment, based on the predetermined image resolution, on the to-be-identified two-dimensional code on which positioning detection is performed includes: performing focus adjustment on the to-be-identified two-dimensional code based on an auto-focusing algorithm to adjust the image resolution of the to-be-identified two-dimensional code.

Further, performing focus adjustment, based on the predetermined image resolution, on the to-be-identified two-dimensional code on which positioning detection is performed includes: performing zooming processing on the to-be-identified two-dimensional code based on the predetermined image resolution to adjust the image resolution of the to-be-identified two-dimensional code.

Further, the method of the present specification further includes: detecting whether a two-dimensional code scanning device for collecting the to-be-identified two-dimensional code has an optical zooming function; and if yes, controlling the two-dimensional code scanning device to collect the to-be-identified two-dimensional code based on a predetermined image resolution; or otherwise, adjusting, through interpolation processing, a collected pixel area of to be identified two-dimensional code.

Further, the method of the present specification further includes: if the two-dimensional code scanning device has the optical zooming function, after controlling the two-dimensional code scanning device to collect the to-be-identified two-dimensional code based on a predetermined image resolution, detecting whether the to-be-identified two-dimensional code satisfies the predetermined image resolution; and if not, adjusting, through interpolation processing, the captured pixel area of the obtained to-be-identified two-dimensional code.

According to a second aspect of the present specification, a two-dimensional code positioning and identification model establishment method is provided, including: collecting a corresponding sample two-dimensional code based on a predetermined environment condition; labeling corresponding identifier information for a specified area of the sample two-dimensional code; and performing training by using the two-dimensional code and identifier information as input data of deep learning to obtain the two-dimensional code positioning and identification model.

Further, according to the method of the present specification, the specified area includes corner points of the sample two-dimensional code.

According to a third aspect of the present specification, a two-dimensional code identification device is provided, including: a two-dimensional code positioning module, configured to obtain a to-be-identified two-dimensional code, and perform global feature positioning detection on the to-be-identified two-dimensional code by using a pre-established two-dimensional code positioning and identification model; a focus adjustment module, configured to perform focus adjustment, based on a predetermined image resolution, on the to-be-identified two-dimensional code on which positioning detection is performed; and a two-dimensional code decoding module, configured to decode the to-be-identified two-dimensional code on which focus adjustment is performed.

Further, the device of the present specification further includes: a two-dimensional code sampling module, configured to collect a corresponding sample two-dimensional code based on a predetermined environment condition; an information identification module, configured to label corresponding identifier information for a specified area of the sample two-dimensional code; and a model generation module, configured to perform training by using the two-dimensional code and identifier information as input data of deep learning to obtain the two-dimensional code positioning and identification model.

Further, the device of the present specification further includes: a resolution determining module, configured to determine whether a resolution of the to-be-identified two-dimensional code satisfies the predetermined image resolution; and if not, perform focus adjustment, based on the predetermined image resolution, on the to-be-identified two-dimensional code on which positioning detection is performed.

Further, the focus adjustment module further includes: a focusing adjustment submodule, configured to perform focusing processing on the to-be-identified two-dimensional code based on an auto-focusing algorithm to adjust the image resolution of the to-be-identified two-dimensional code.

Further, the focus adjustment module further includes: a zooming adjustment submodule, configured to perform zooming processing on the to-be-identified two-dimensional code based on the predetermined image resolution to adjust the image resolution of the to-be-identified two-dimensional code.

Further, the zooming adjustment submodule is further configured to: detect whether a two-dimensional code scanning device for collecting the to-be-identified two-dimensional code has an optical zooming function; and if yes, control the two-dimensional code scanning device to collect the to-be-identified two-dimensional code based on a predetermined image resolution; or otherwise, adjust, through interpolation processing, a captured pixel area of to be identified two-dimensional code.

Further, the zooming adjustment submodule is further configured to: if the two-dimensional code scanning device has the optical zooming function, after controlling the two-dimensional code scanning device to collect the to-be-identified two-dimensional code based on a predetermined image resolution, detect whether the to-be-identified two-dimensional code satisfies the predetermined image resolution; if not, According to a fourth aspect of the present specification, a two-dimensional code positioning and identification model establishment device is provided, including: a two-dimensional code sampling module, configured to collect a corresponding sample two-dimensional code based on a predetermined environment condition; an information identification module, configured to label corresponding identifier information for a specified area of the sample two-dimensional code; and a model generation module, configured to perform training by using the two-dimensional code and identifier information as input data of deep learning to obtain the two-dimensional code positioning and identification model.

Further, the specified area includes corner points of the sample two-dimensional code.

According to a fifth aspect of the present specification, a storage medium is provided, where the storage medium stores computer program instructions, and the computer program instructions are executed according to the methods of the present specification.

According to a sixth aspect of the present specification, a computing device is provided, including: a memory, configured to store computer program instructions, and a processor, configured to execute the computer program instructions, where when the computer program instructions are executed by the processor, the computing device is triggered to perform the methods of the present specification.

According to the two-dimensional code identification method and device provided in the present specification, a pre-established two-dimensional code positioning and identification model is used to perform global feature positioning detection on the obtained to-be-identified two-dimensional code, focus adjustment is performed, based on the predetermined image resolution, on the to-be-identified two-dimensional code on which positioning detection is performed, and then the to-be-identified two-dimensional code is decoded. A pre-established two-dimensional code positioning and identification model is used to perform positioning detection on the obtained to-be-identified two-dimensional code, so that the identification accuracy of the blurred two-dimensional code captured in a complex scenario is improved. In addition, focus adjustment is performed, based on the predetermined image resolution, on the to-be-identified two-dimensional code on which positioning detection is performed, so that the resolution of the blurred two-dimensional code can be automatically adjusted and the user experience can be greatly improved.

BRIEF DESCRIPTION OF DRAWINGS

Other features, objectives, and advantages of the present specification will become more clear by reading the detailed description of the non-limiting implementations with reference to the following accompanying drawings.

Same or similar reference numerals in the accompanying drawings represent same or similar components.

DESCRIPTION OF IMPLEMENTATIONS

The present specification is described below with reference to the accompanying drawings.

In a typical configuration of the present specification, a terminal and a device serving a network each include one or more processors (CPUs), input/output interfaces, network interfaces, and memories.

The memory can include a non-persistent memory, a random access memory (RAM), a non-volatile memory, and/or other forms that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program device, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible to a computing device.

Figure 1:
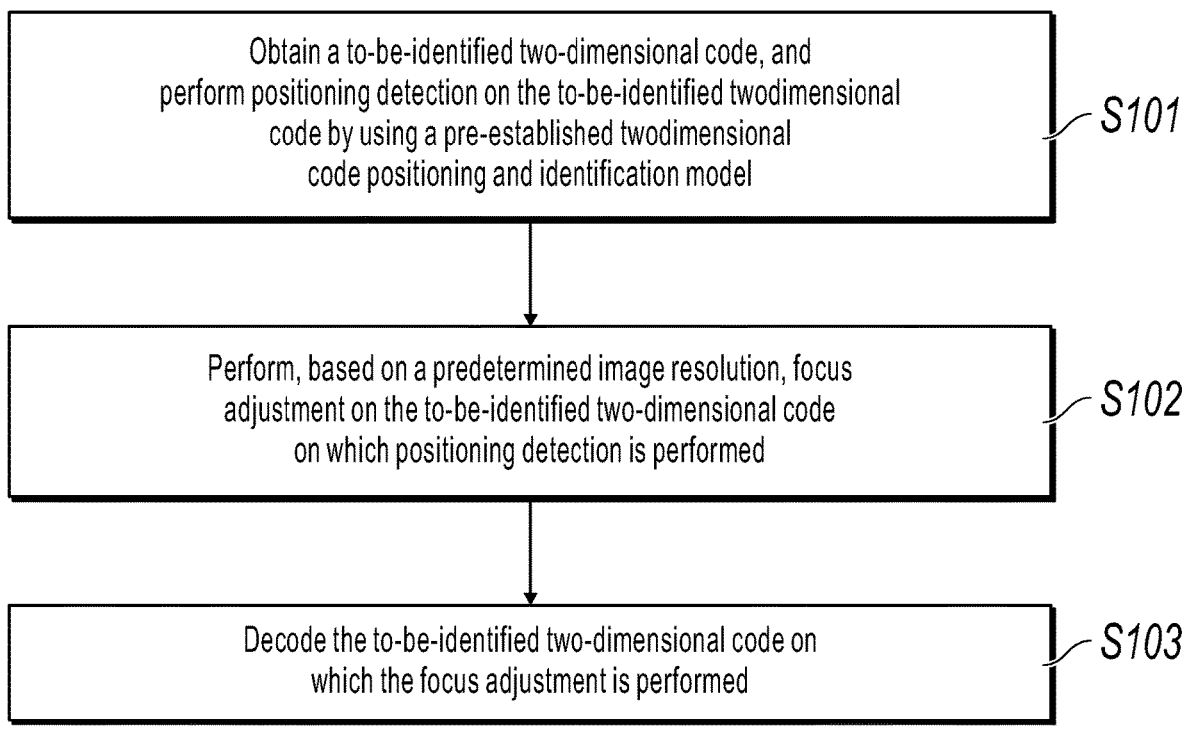
FIG. 1 is a schematic flowchart illustrating a two-dimensional code identification method, according to a first implementation of the present specification.

In some implementations, the techniques disclosed herein allow for codes to be quickly decoded. For example, in scenarios in which long-distance code-scanning payment is required, such as parking charging and expressway toll charging, slow decoding resulting from low resolution of the two-dimensional code caused by a long capture distance can be reduced or avoided. Accordingly, in some implementations, the enhanced decoding techniques disclosed herein may allow quicker and more accurate decoding and thus an improvement in payment efficiency FIG. 1 is a schematic flowchart illustrating a two-dimensional code identification method, according to a first implementation of the present specification. The two-dimensional code identification method can be applied to terminal devices with an image collecting function such as a mobile phone, a pad, and a payment device. As shown in FIG. 1, the first implementation of the present specification provides a two-dimensional code identification method, including steps S101 to S103.

Step S101: Obtain a to-be-identified two-dimensional code, and detect the to-be-identified two-dimensional code by using a pre-established two-dimensional code positioning and identification model.

Step S102: Perform, based on a predetermined image resolution, focus adjustment on the to-be-identified two-dimensional code on which positioning detection is performed.

Step S103: Decode the to-be-identified two-dimensional code on which focus adjustment is performed.

In step S101, based on different application scenarios, the to-be-identified two-dimensional code can be a two-dimensional code used for opening a car lock or unlocking a door lock, a two-dimensional code used for paying or receiving money, or a two-dimensional code used for identification. The two-dimensional code positioning and identification model is established after training is performed based on the input data such as a sample two-dimensional code and labeled identifier information. The collected to-be-identified two-dimensional code is input into the two-dimensional code positioning and identification model, and global feature positioning detection is performed on the to-be-identified two-dimensional code, to output the positioned to-be-identified two-dimensional code.

The two-dimensional code positioning and identification model established in step S101 can be established in advance by a server based on input parameters. The established two-dimensional code positioning and identification model can include: collecting a corresponding sample two-dimensional code based on a predetermined environment condition; labeling corresponding identifier information for a specified area of the sample two-dimensional code; and performing training by using the sample two-dimensional code and the identifier information as input data of deep learning to obtain the two-dimensional code positioning and identification model. Specifically:

A corresponding two-dimensional code sampling mode is set based on the current application scenario. For example, in a scenario in which long-distance code-scanning payment is required, such as expressway toll charging, the set sampling mode may be: collecting a plurality of corresponding sample two-dimensional codes based on different distances of the two-dimensional code display device. For another example, in a scenario in which a parking charging station is located at a curved parking exit, and the set collecting method can be: collecting a plurality of corresponding sample two-dimensional codes based on different angles of the two-dimensional code display device. In addition, two-dimensional codes can be collected based on different conditions such as a lighting condition, or different lighting conditions combine with different distances and angles. Different distances, different angles, and different lighting conditions can be determined through tests based on conditions in actual scenarios, such as a collecting position of the two-dimensional code collecting device, which is not limited in the present specification. Corresponding identifier information is labeled for the specified areas of a plurality of captured sample two-dimensional codes. The specified area is an area that indicates the position of a two-dimensional code in an image, for example, four corner points of a two-dimensional code, or a position pattern in a two-dimensional code. Then, corresponding identifier information can be added to the specified area by manual labeling or by automatically identifying and labeling the specified area. Training is performed by using the sample two-dimensional code and the identifier information labeled for the specified area as input data of the deep learning network, and the two-dimensional positioning and identification model (that is, network structure and parameters) is obtained after network convergence. The deep learning network can be a deep convolutional neural network, Faster R-CNN, YOLO, SSD, etc.

Figure 2:
FIG. 2 is a schematic flowchart illustrating a two-dimensional code identification method, according to a second implementation of the present specification.

In some implementations of the present specification, for example, the current application scenario is a scenario in which long-distance code-scanning payment needs to be performed, the set sampling distances are respectively based on the corresponding plurality of sample two-dimensional codes collected at different distances (that is 1 m, 1.5 m, 1.8 m, and 2 m) from the two-dimensional code display device, and the corresponding resolutions of the plurality of sample two-dimensional codes shot at different distances are recorded; the specified area in the two-dimensional code positioning and identification model is the four corner points of the sample two-dimensional code. As shown in FIG. 2, the identifier information of the specified area respectively corresponds to the upper left corner, the lower left corner, the upper right corner, and the lower right corner in the four corner points of the sample two-dimensional code. After the to-be-identified two-dimensional code collected by the user at a distance of 1.8 m away from the two-dimensional code display device is obtained, a resolution of the to-be-identified two-dimensional code is determined, and a sample two-dimensional code whose resolution best matches that of the to-be-identified two-dimensional code is detected in the two-dimensional code positioning and identification model; then the global features of the to-be-identified two-dimensional code are positioned based on the sample two-dimensional code and its identifier information "the upper left corner, the lower left corner, the upper right corner, and the lower right corner in the four corner points", so that the to-be-identified two-dimensional code after the positioning is input.

In step S102, focus adjustment is performed, based on a predetermined image resolution, on the to-be-identified two-dimensional code on which positioning detection is performed.

The predetermined image resolution can be a minimum standard that satisfies a condition for identifying a two-dimensional code, or can be a maximum resolution that can be achieved by a two-dimensional code scanning device when capturing an image, or can also be another value predetermined by a user as required, which is not specifically limited here.

In scenarios in which the condition for obtaining a two-dimensional code is complex, for example, such as parking charging and expressway toll charging, the to-be-identified two-dimensional code collected by the two-dimensional code scanning device may not be effectively identified because of a low resolution of the code area. To improve the accuracy of two-dimensional code identification, in an implementation of the present specification, after the positioning of the to-be-identified two-dimensional code is completed, focus adjustment can be performed, based on a predetermined image resolution, on the to-be-identified two-dimensional code on which positioning detection is performed, where the focus adjustment can include focusing and/or zooming processing. Specifically, focus adjustment may be performed on the identification two-dimensional code according to the automatic focusing algorithm to adjust the image resolution of the to-be-identified two-dimensional code. The auto-focusing algorithm can be ranging auto-focusing, focusing detection auto-focusing (for example, a contrast detection autofocus algorithm), etc. By using the focusing algorithm to perform focus adjustment on the to-be-identified two-dimensional code, the area of to-be-identified two-dimensional code are enabled to be in the clearest state, to avoid a decoding failure caused by a blurred two-dimensional code.

Figure 3:
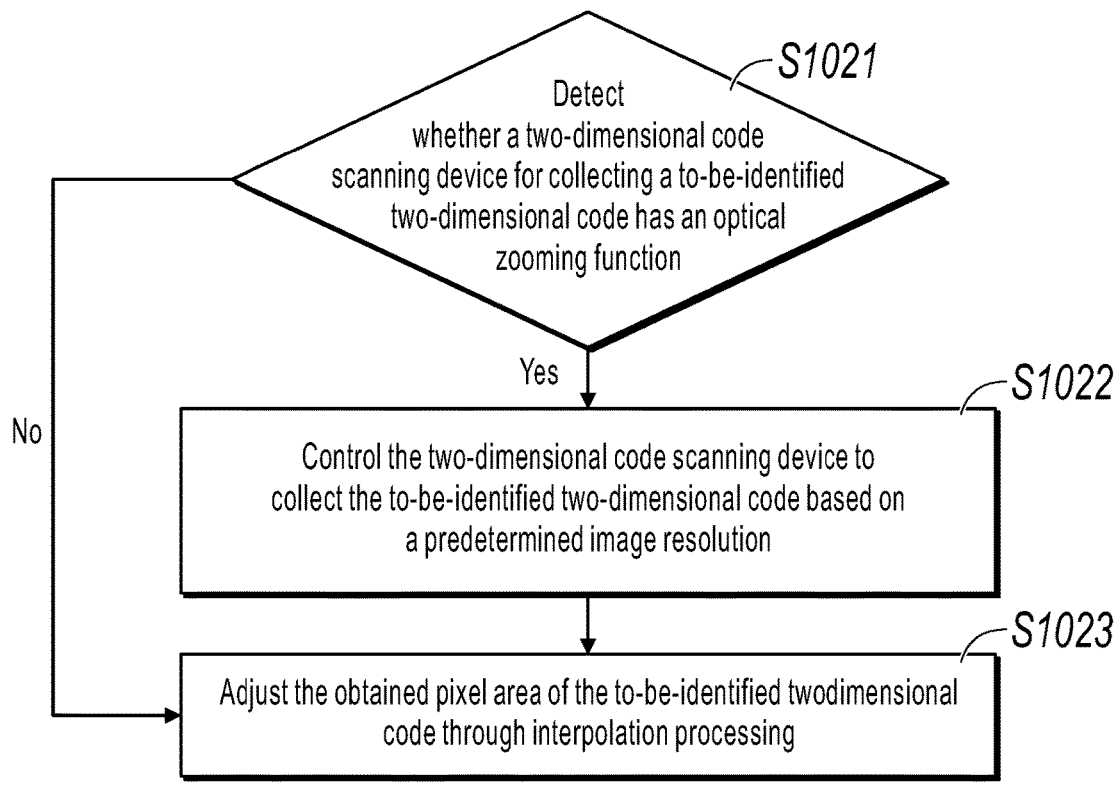
FIG. 3 is a schematic diagram illustrating two-dimensional code identifier information, according to the implementations of the present specification.

FIG. 3 is a schematic flowchart illustrating a two-dimensional code identification method, according to a second implementation of the present specification. In the two-dimensional code identification method according to the second implementation of the present specification, after focusing is completed, if the resolution of the to-be-identified two-dimensional code is lower than the predetermined image resolution, zooming processing can be further performed on the to-be-identified two-dimensional code based on the predetermined image resolution, to adjust the image resolution of the to-be-identified two-dimensional code. Specifically, step S1021 to step S1023 are included.

Step S1021: Detect whether a two-dimensional code scanning device for collecting a to-be-identified two-dimensional code has an optical zooming function. If yes, perform step S1022; or otherwise, perform step S1023.

Step S1022: Control the two-dimensional code scanning device to collect the to-be-identified two-dimensional code based on a predetermined image resolution.

Step S1023: Adjust the obtained pixel area of the to-be-identified two-dimensional code through interpolation processing.

In step S1021 to step S1023, for a two-dimensional code scanning device that supports optical zooming, the optical zooming method can be prioritized to control the two-dimensional code scanning device to collect, based on the predetermined image resolution, a to-be-identified two-dimensional code that satisfies the predetermined image resolution requirement, or collect a to-be-identified two-dimensional code that satisfies the predetermined image resolution requirement as much as possible, so as to realize lossless magnification. For a two-dimensional code scanning device that does not support optical zooming, a digital zooming method can be used to increase the area of each pixel of the to-be-identified two-dimensional code by using a processor in the two-dimensional code scanning device, so that the area of the to-be-identified two-dimensional code is magnified to a predetermined image resolution.

For a two-dimensional code scanning device that supports optical zooming, the to-be-identified two-dimensional code collected by the super-distance may still not satisfy the predetermined image resolution requirement after the resolution is adjusted through optical zooming. Therefore, if it is determined that the two-dimensional code scanning device has the optical zooming function, after the two-dimensional code scanning device is controlled to obtain the to-be-identified two-dimensional code based on the predetermined image resolution, it can be further determined whether the to-be-identified two-dimensional code satisfies the predetermined image resolution. If the to-be-identified two-dimensional code does not satisfy the predetermined image resolution, the obtained pixel area of the to-be-identified two-dimensional code can be adjusted through interpolation processing method, that is, to increase the area of each pixel of the to-be-identified two-dimensional code, so that the area of the to-be-identified two-dimensional code is magnified to a predetermined image resolution.

In step S103, the to-be-identified two-dimensional code on which focus adjustment is performed is decoded.

After focus adjustment is performed on the to-be-identified two-dimensional code, the symbol image, format information, and version information of the to-be-identified two-dimensional code are identified, the mask is eliminated, the symbol characters are identified based on the arrangement rule of the module, the information data and error correction code are recovered, and then data characters are obtained through error correction and decoding and then output, to complete the decoding of the to-be-identified two-dimensional code. Because the resolution of the to-be-identified two-dimensional code has reached or approximated to the predetermined image resolution after focus adjustment is performed on the to-be-identified two-dimensional code, the decoding success rate of the to-be-identified two-dimensional code can be significantly increased and the identification time can be significantly reduced when the to-be-identified two-dimensional code is decoded.

Figure 4:
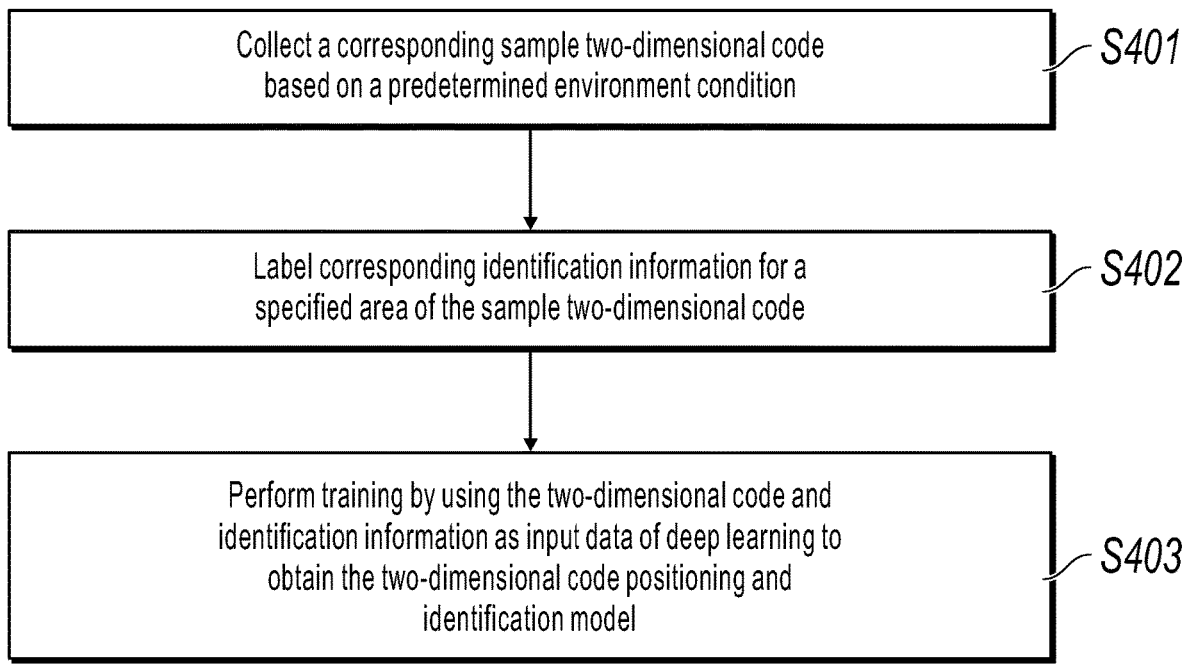
FIG. 4 is a schematic flowchart illustrating a two-dimensional code positioning and identification model establishment method, according to a third implementation of the present specification.

FIG. 4 is a schematic flowchart illustrating a two-dimensional code positioning and identification model establishment method, according to a third implementation of the present specification. The two-dimensional code positioning and identification model establishment method according to the third implementation of the present specification can be applied to a server, and the server completes the establishment of the two-dimensional code positioning and identification model. The two-dimensional code positioning and identification model establishment method according to the third implementation of the present specification can include:

Step S401: collect a corresponding sample two-dimensional code based on a predetermined environment condition;

Step S402: Label corresponding identifier information for a specified area of the sample two-dimensional code;

Step S403: Perform training by using the two-dimensional code and identifier information as input data of deep learning to obtain the two-dimensional code positioning and identification model.

In step S401, a corresponding two-dimensional code sampling mode can be set based on the current application scenario. For example, in a scenario in which long-distance code-scanning payment is required, such as expressway toll charging, the set sampling mode may be: collecting a plurality of corresponding sample two-dimensional codes based on different distances of the two-dimensional code display device. For another example, in a scenario in which a parking charging station is located at a curved parking exit, and the set sampling mode can be: collecting a plurality of corresponding sample two-dimensional codes based on different angles of the two-dimensional code display device. In addition, two-dimensional codes can be collected based on different conditions such as a lighting condition, or different lighting conditions combine with different distances and angles. Different distances, different angles, and different lighting conditions can be determined through tests based on conditions in actual scenarios, such as a collecting position of the two-dimensional code collecting device, which is not limited in the present specification.

In step S402, corresponding identifier information is labeled for a specified area of a plurality of sample two-dimensional codes. The specified area is an area that indicates the position of a two-dimensional code in an image, for example, at least one corner of a two-dimensional code, or a position pattern in a two-dimensional code. Then, corresponding identifier information can be added to the specified area by manual labeling or by automatically identifying and labeling the specified area.

In step S403, training is performed by using the sample two-dimensional code and the identifier information labeled for the specified area as input data of the deep learning network, and the two-dimensional positioning and identification model (that is, network structure and parameters) is obtained after network convergence. The deep learning network can be a deep convolutional neural network, Faster R-CNN, YOLO, SSD, etc.

In some implementations of the present specification, for example, the current application scenario is a scenario in which long-distance code-scanning payment needs to be performed, the set sampling distances are respectively based on the corresponding plurality of sample two-dimensional codes collected at different distances (that is 1 m, 1.5 m, 1.8 m, and 2 m) from the two-dimensional code display device, and the corresponding resolutions of the plurality of sample two-dimensional codes captured at different distances are recorded; the specified area in the two-dimensional code positioning and identification model is the four corner points of the sample two-dimensional code. As shown in FIG. 3, the identifier information of the specified area respectively corresponds to the upper left corner, the lower left corner, the upper right corner, and the lower right corner in the four corner points of the sample two-dimensional code. After the to-be-identified two-dimensional code collected by the user at a distance of 1.8 m away from the two-dimensional code display device is obtained, a resolution of the to-be-identified two-dimensional code is determined, and a sample two-dimensional code whose resolution best matches that of the to-be-identified two-dimensional code is detected in the two-dimensional code positioning and identification model; then the global features of the to-be-identified two-dimensional code are positioned based on the sample two-dimensional code and its identifier information "the upper left corner, the lower left corner, the upper right corner, and the lower right corner in the four corner points", so that the to-be-identified two-dimensional code after the positioning is input. Finally, training is performed by using the two-dimensional code and identifier information as input data of deep learning to complete the establishment of the two-dimensional code positioning and identification model.

Figure 5:
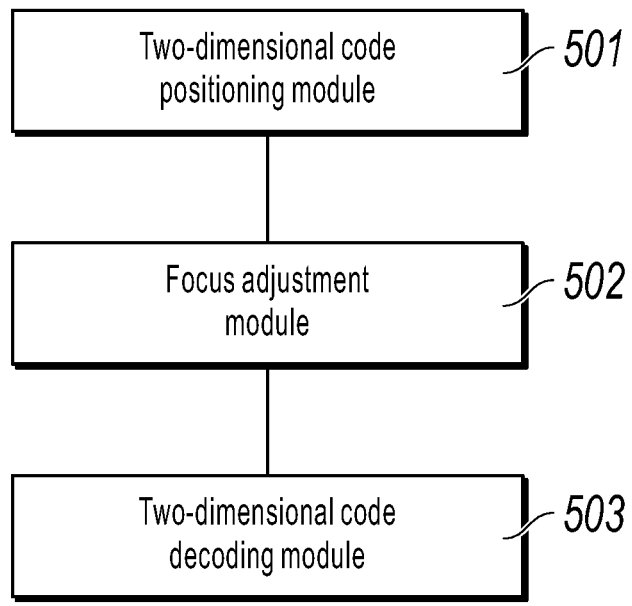
FIG. 5 is a schematic flowchart illustrating a two-dimensional code identification device, according to the implementations of the present specification.

FIG. 5 is a schematic structural diagram illustrating a two-dimensional code identification device, according to the implementations of the present specification. As shown in FIG. 5, the two-dimensional code identification device provided in some implementations of the present specification includes a two-dimensional code positioning module 501, a focus adjustment module 502, and a two-dimensional code decoding module 503.

The two-dimensional code positioning module 501 is configured to obtain a to-be-identified two-dimensional code, and perform global feature positioning detection on the to-be-identified two-dimensional code by using a pre-established two-dimensional code positioning and identification model.

The focus adjustment module 502 is configured to perform focus adjustment, based on a predetermined image resolution, on the to-be-identified two-dimensional code on which positioning detection is performed.

The two-dimensional code decoding module 503 is configured to decode the to-be-identified two-dimensional code on which focus adjustment is performed.

Further, the device further includes: a two-dimensional code sampling module, configured to collect a corresponding sample two-dimensional code based on a predetermined environment condition; an information identification module, configured to label corresponding identifier information for a specified area of the sample two-dimensional code; and a model generation module, configured to perform training by using the two-dimensional code and identifier information as input data of deep learning to obtain the two-dimensional code positioning and identification model.

Further, the device further includes: a resolution determining module, configured to determine whether a resolution of the to-be-identified two-dimensional code satisfies the predetermined image resolution; and if not, perform focus adjustment, based on the predetermined image resolution, on the to-be-identified two-dimensional code on which positioning detection is performed.

Further, the focus adjustment module further includes: a focusing adjustment submodule, configured to perform focusing processing on the to-be-identified two-dimensional code based on an auto-focusing algorithm to adjust the image resolution of the to-be-identified two-dimensional code.

Further, the focus adjustment module further includes: a zooming adjustment submodule, configured to perform zooming processing on the to-be-identified two-dimensional code based on the predetermined image resolution to adjust the image resolution of the to-be-identified two-dimensional code.

Further, the zooming adjustment submodule is further configured to: detect whether a two-dimensional code scanning device for capturing the to-be-identified two-dimensional code has an optical zooming function; and if yes, control the two-dimensional code scanning device to collect the to-be-identified two-dimensional code based on a predetermined image resolution; or otherwise, adjust, through interpolation processing, a collected pixel area of to be identified two-dimensional code.

Further, the zooming adjustment submodule is further configured to: if the two-dimensional code scanning device has the optical zooming function, after controlling the two-dimensional code scanning device to collect the to-be-identified two-dimensional code based on a predetermined image resolution, detect whether the to-be-identified two-dimensional code satisfies the predetermined image resolution;

The device shown in FIG. 5 in some implementations of the present specification is an implementation device of the methods shown in FIG. 1 and FIG. 2 in the implementations of the present specification. A specific principle of the device is the same as that of the methods shown in FIG. 1 and FIG. 2 in the implementations of the present specification. Details are omitted here for simplicity.

Figure 6:
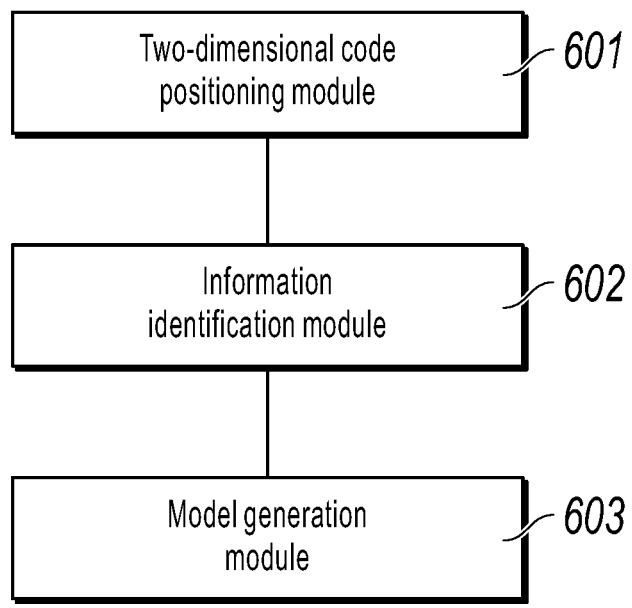
FIG. 6 is a schematic flowchart illustrating a two-dimensional code positioning and identification model establishment device, according to the implementations of the present specification.

FIG. 6 is a schematic structural diagram illustrating a two-dimensional code positioning and identification model establishment device, according to the implementations of the present specification. As shown in FIG. 6, the two-dimensional code positioning and identification model establishment device provided in some implementations of the present specification includes a two-dimensional code sampling module 601, an information identification module 602, and a model generation module 603.

The two-dimensional code sampling module 601 is configured to collect a corresponding sample two-dimensional code based on a predetermined environment condition.

The information identification module 602 is configured to label corresponding identifier information for a specified area of the sample two-dimensional code.

The model generation module 603 is configured to perform training by using the two-dimensional code and identifier information as input data of deep learning to obtain the two-dimensional code positioning and identification model.

Further, the specified area includes corner points of the sample two-dimensional code.

The device shown in FIG. 6 in some implementations of the present specification is an implementation device of the methods shown in FIG. 4 in the implementations of the present specification. A specific principle of the device is the same as that of the method shown in FIG. 4 in the implementations of the present specification. Details are omitted here for simplicity. In the implementations of the present specification, a storage device is further provided, where the storage device stores computer program instructions, and the computer program instructions are executed according to the methods shown in FIG. 1, FIG. 2, and FIG. 4 of the present specification.

In an implementation of the present specification, a computing device is further provided, including: a memory, configured to store computer program instructions, and a processor, configured to execute the computer program instructions, where when the computer program instructions are executed by the processor, the computing device is triggered to perform the methods shown in FIG. 1, FIG. 2, and FIG. 4 of the present specification.

In addition, in some implementations of the present specification, a computer readable medium is further provided, where the computer readable medium stores computer program instructions that can be executed by a processor to implement the methods and/or technical solutions according to the previous implementations of the present specification.

It is worthwhile to note that the present specification can be implemented by software and/or a combination of software and hardware, for example, using an application specific integrated circuit (ASIC), a general purpose computer, or any other similar hardware device. In some implementations, the software program of the present specification can be executed by a processor to implement the previous steps or functions. Similarly, the software program of the present specification (including a related data structure) can be stored in a computer readable recording medium, such as a RAM memory, a magnetic or optical drive, or a floppy disk. In addition, some of the steps or functions of the present specification can be implemented by hardware, for example, as a circuit that cooperates with the processor to perform various steps or functions.

It is clear to a person skilled in the art that the present specification is not limited to the details of the example implementations described above, and that the present specification can be implemented in other specific forms without departing from the spirit or basic features of the present specification. Therefore, from any point of view, the implementations should be considered examples and non-limiting, and the scope of the present specification is limited by the appended claims rather than the previous description, so that all changes that fall within the meaning and scope of the equivalents of the claims are intended to be encompassed within the present specification. Any reference numerals in the claims shall not be construed as limiting the claims to which they relate. In addition, it is clear that the term "inclusive" does not preclude other units or steps, and a singular form does not preclude a plural form. The plurality of units or devices described in the claims of the device can also be implemented by a unit or device by using software or hardware. Words such as "first" and "second" are used to represent names rather than any particular order.

What is claimed is:

1. A computer-implemented method, comprising:
obtaining an image of a reference two-dimensional code;
obtaining a first resolution of the image of the reference two-dimensional code;
obtaining a sample two-dimensional code based on a predetermined environment condition;
obtaining a second resolution of the sample two-dimensional code;
determining that the second resolution of the sample two-dimensional code matches the first resolution of the reference two-dimensional code;
positioning global features of the reference two-dimensional code based on the sample two-dimensional code and identifier information of the sample two-dimensional code, wherein the identifier information comprises one or more global features of the sample two-dimensional code;
providing the reference two-dimensional code and the global features of the reference two-dimensional code as training data to train a two-dimensional code positioning and identification model;
detecting a third two-dimensional code within a second obtained image by performing global feature positioning detection using the two-dimensional code positioning and identification model;
subsequent to detecting the third two-dimensional code, obtaining a focus-adjusted image of the third two-dimensional code based on a predetermined image resolution; and
decoding the third two-dimensional code from the focus-adjusted image of the third two-dimensional code.

2. The computer-implemented method of claim 1, wherein the method comprises:
determining that a resolution of the second obtained image of the third two-dimensional code fails to satisfy the predetermined image resolution; and obtaining the focus-adjusted image of the third two-dimensional code based on the predetermined image resolution responsive to determining that the resolution of the third two-dimensional code fails to satisfy the predetermined image resolution.

3. The computer-implemented method of claim 1, wherein obtaining the focus-adjusted image of the third two-dimensional code based on the predetermined image resolution comprises applying an auto-focusing algorithm to obtain an updated image of the third two-dimensional code at a different resolution.

4. The computer-implemented method of claim 1, wherein obtaining the focus-adjusted image of the third two-dimensional code based on the predetermined image resolution comprises applying a zoom adjustment based on the predetermined image resolution to obtain an updated image of the third two-dimensional code at a different resolution.

5. The computer-implemented method of claim 4, wherein applying the zoom adjustment comprises:
- detecting whether a two-dimensional code scanning device comprises an optical zoom function; and
- based on detecting that the two-dimensional code scanning device has the optical zoom function, adjusting the two-dimensional code scanning device to a new zoom level, and capturing a revised image of the third two-dimensional code at the new zoom level, or
- based on detecting that the two-dimensional code scanning device does not have the optical zoom function, applying an image interpolation process to a captured pixel area of the second obtained image of the third two-dimensional code.

6. The computer-implemented method of claim 5, wherein, after capturing the revised image of the third two-dimensional code, the method further comprises:
- determining the third two-dimensional code does not satisfy the predetermined image resolution; and
- applying an interpolation process to the captured pixel area of the revised image of the third two-dimensional code.

7. The computer-implemented method of claim 1, wherein the two-dimensional code positioning and identification model comprises a machine learning network and the method comprises generating the machine learning network, wherein generating the machine learning network comprises:
- labeling corresponding identifier information for a specified area of the sample two-dimensional code; and
- performing training by using the sample two-dimensional code and the identifier information as input data for the machine learning network to obtain the two-dimensional code positioning and identification model.

8. The computer-implemented method of claim 7, wherein the machine learning network is a convolution neural network, deep learning network, deep convolutional neural network, regions with convolutional neural networks (R-CNN), Faster R-CNN, regression-based detection methods, you only look once (YOLO), or single-shot detector (SSD).

9. The method according to claim 7, wherein the specified area is a corner point of the sample two-dimensional code.

10. A non-transitory, computer-readable medium storing one or more instructions executable by a computer system to perform operations comprising:
- obtaining an image of a reference two-dimensional code;
- obtaining a first resolution of the image of the reference two-dimensional code;
- obtaining a sample two-dimensional code based on a predetermined environment condition;
- obtaining a second resolution of the sample two-dimensional code;
- determining that the second resolution of the sample two-dimensional code matches the first resolution of the reference two-dimensional code;
- positioning global features of the reference two-dimensional code based on the sample two-dimensional code and identifier information of the sample two-dimensional code, wherein the identifier information comprises one or more global features of the sample two-dimensional code;
- providing the reference two-dimensional code and the global features of the reference two-dimensional code as training data to train a two-dimensional code positioning and identification model;
- detecting a third two-dimensional code within a second obtained image by performing global feature positioning detection using the two-dimensional code positioning and identification model;
- subsequent to detecting the third two-dimensional code, obtaining a focus-adjusted image of the third two-dimensional code based on a predetermined image resolution; and
- decoding the third two-dimensional code from the focus-adjusted image of the third two-dimensional code.

11. The non-transitory, computer-readable medium of claim 10, wherein the operations comprise:
- determining that a resolution of the second obtained image of the third two-dimensional code fails to satisfy the predetermined image resolution; and obtaining the focus-adjusted image of the third two-dimensional code based on the predetermined image resolution responsive to determining that the resolution of the third two-dimensional code fails to satisfy the predetermined image resolution.

12. The non-transitory, computer-readable medium of claim 10, wherein obtaining the focus-adjusted image of the third two-dimensional code based on the predetermined image resolution comprises applying an auto-focusing algorithm to obtain an updated image of the third two-dimensional code at a different resolution.

13. The non-transitory, computer-readable medium of claim 10, wherein obtaining the focus-adjusted image of the third two-dimensional code based on the predetermined image resolution comprises applying a zoom adjustment based on the predetermined image resolution to obtain an updated image of the third two-dimensional code at a different resolution.

14. The non-transitory, computer-readable medium of claim 13, wherein applying the zoom adjustment comprises:
- detecting whether a two-dimensional code scanning device comprises an optical zoom function; and
- based on detecting that the two-dimensional code scanning device has the optical zoom function, adjusting the two-dimensional code scanning device to a new zoom level, and capturing a revised image of the third two-dimensional code at the new zoom level, or
- based on detecting that the two-dimensional code scanning device does not have the optical zoom function, applying an image interpolation process to a captured pixel area of the second obtained image of the third two-dimensional code.

15. The non-transitory, computer-readable medium of claim 14, wherein, after capturing the revised image of the third two-dimensional code, the operations further comprise:
- determining the third two-dimensional code does not satisfy the predetermined image resolution; and applying an interpolation process to the captured pixel area of the revised image of the third two-dimensional code.

16. The non-transitory, computer-readable medium of claim 10, wherein the two-dimensional code positioning and identification model comprises a machine learning network and operations comprise generating the machine learning network, wherein generating the machine learning network comprises:
- labeling corresponding identifier information for a specified area of the sample two-dimensional code; and
- performing training by using the sample two-dimensional code and the identifier information as input data for the machine learning network to obtain the two-dimensional code positioning and identification model.

17. The non-transitory, computer-readable medium of claim 16, wherein the machine learning network is a form of convolution neural network, deep learning network, deep convolutional neural network, regions with convolutional neural networks (R-CNN), Faster R-CNN, regression-based detection methods, you only look once (YOLO), or single-shot detector (SSD).

18. The non-transitory, computer-readable medium of claim 16, wherein the specified area is a corner point of the sample two-dimensional code.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
- obtaining an image of a reference two-dimensional code;
- obtaining a first resolution of the image of the reference two-dimensional code;
- obtaining a sample two-dimensional code based on a predetermined environment condition;
- obtaining a second resolution of the sample two-dimensional code;
- determining that the second resolution of the sample two-dimensional code matches the first resolution of the reference two-dimensional code;
- positioning global features of the reference two-dimensional code based on the sample two-dimensional code and identifier information of the sample two-dimensional code, wherein the identifier information comprises one or more global features of the sample two-dimensional code;
- providing the reference two-dimensional code and the global features of the reference two-dimensional code as training data to train a two-dimensional code positioning and identification model;
- detecting a third two-dimensional code within a second obtained image by performing global feature positioning detection using the two-dimensional code positioning and identification model;
- subsequent to detecting the third two-dimensional code, obtaining a focus-adjusted image of the third two-dimensional code based on a predetermined image resolution; and
- decoding the third two-dimensional code from the focus-adjusted image of the third two-dimensional code.

20. The computer-implemented system of claim 19, wherein the operations comprise:
- determining that a resolution of the second obtained image of the third two-dimensional code fails to satisfy the predetermined image resolution; and obtaining the focus-adjusted image of the third two-dimensional code based on the predetermined image resolution responsive to determining that the resolution of the third two-dimensional code fails to satisfy the predetermined image resolution.

21. The computer-implemented system of claim 19, wherein obtaining the focus-adjusted image of the third two-dimensional code based on the predetermined image resolution comprises applying an auto-focusing algorithm to obtain an updated image of the third two-dimensional code at a different resolution.

22. The computer-implemented system of claim 19, wherein obtaining the focus-adjusted image of the third two-dimensional code based on the predetermined image resolution comprises applying a zoom adjustment based on the predetermined image resolution to obtain an updated image of the third two-dimensional code at a different resolution.

23. The computer-implemented system of claim 22, wherein applying the zoom adjustment comprises:
- detecting whether a two-dimensional code scanning device comprises an optical zoom function; and
- based on detecting that the two-dimensional code scanning device has the optical zoom function, adjusting the two-dimensional code scanning device to a new zoom level, and capturing a revised image of the third two-dimensional code at the new zoom level, or
- based on detecting that the two-dimensional code scanning device does not have the optical zoom function, applying an image interpolation process to a captured pixel area of the second obtained image of the third two-dimensional code.

24. The computer-implemented system of claim 23, wherein, after capturing the revised image of the third two-dimensional code, the operations further comprise:
- determining the third two-dimensional code does not satisfy the predetermined image resolution; and
- applying an interpolation process to the captured pixel area of the revised image of the third two-dimensional code.

25. The computer-implemented system of claim 19, wherein the two-dimensional code positioning and identification model comprises a machine learning network and the operations comprise generating the machine learning network, wherein generating the machine learning network comprises:
- labeling corresponding identifier information for a specified area of the sample two-dimensional code; and
- performing training by using the sample two-dimensional code and the identifier information as input data for the machine learning network to obtain the two-dimensional code positioning and identification model.

26. The computer-implemented system of claim 25, wherein the machine learning network is a form of convolution neural network, deep learning network, deep convolutional neural network, regions with convolutional neural networks (R-CNN), Faster R-CNN, regression-based detection methods, you only look once (YOLO), or single-shot detector (SSD).

27. The computer-implemented system of claim 25, wherein the specified area is a corner point of the sample two-dimensional code.

* * * * *

UNITED STATES PATENT AND TRADEMARK OFFICE
CERTIFICATE OF CORRECTION

PATENT NO. : 10,956,696 B2  
APPLICATION NO. : 16/809256  
DATED : March 23, 2021  
INVENTOR(S) : Mingjie Liang et al.

Page 1 of 1

It is certified that error appears in the above-identified patent and that said Letters Patent is hereby corrected as shown below:

In the Claims

In Column 15, Line 7, Claim 16, delete "and operations" and insert -- and the operations --, therefor.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*